US010184557B2

United States Patent
Kato et al.

(10) Patent No.: US 10,184,557 B2
(45) Date of Patent: Jan. 22, 2019

(54) SHIFT DEVICE FOR VEHICLE

(71) Applicants: TOYOTA JIDOSHA KABUSHIKI KAISHA, Toyota-shi, Aichi-ken (JP); TSUDA INDUSTRIES CO., LTD., Kariya-shi, Aichi-ken (JP); KABUSHIKI KAISHA TOKAI RIKA DENKI SEISAKUSHO, Niwa-gun, Aichi (JP); MANNOH INDUSTRIAL CO., LTD., Anjo, Aichi (JP)

(72) Inventors: Shori Kato, Tajimi (JP); Etsuo Shimizu, Toyota (JP); Takayoshi Kitahara, Nagoya (JP); Saburo Kato, Toyota (JP); Hironori Mizuno, Ichinomiya (JP); Takayoshi Masuda, Anjo (JP); Hideaki Ito, Inuyama (JP)

(73) Assignees: TOYOTA JIDOSHA KABUSHIKI KAISHA, Toyota (JP); TSUDA INDUSTRIES CO., LTD., Kariya (JP); KABUSHIKI KAISHA TOKAI RIKA DENKI SEISAKUSHO, Niwa (JP); MANNOH INDUSTRIAL CO., LTD., Anjo (JP)

(*) Notice: Subject to any disclaimer, the term of this patent is extended or adjusted under 35 U.S.C. 154(b) by 351 days.

(21) Appl. No.: 15/161,598

(22) Filed: May 23, 2016

(65) Prior Publication Data
US 2016/0348784 A1 Dec. 1, 2016

(30) Foreign Application Priority Data

Jun. 1, 2015 (JP) ................................. 2015-111777

(51) Int. Cl.
F16H 59/10 (2006.01)
F16H 59/02 (2006.01)
(Continued)

(52) U.S. Cl.
CPC ............. *F16H 59/10* (2013.01); *B60K 20/02* (2013.01); *F16H 59/0278* (2013.01); *F16H 61/22* (2013.01); *F16H 2059/0282* (2013.01)

(58) Field of Classification Search
CPC ...... F16H 59/10; F16H 59/0278; F16H 61/22; F16H 2059/0282
See application file for complete search history.

(56) References Cited

U.S. PATENT DOCUMENTS 2,945,570 A * 7/1960 Ferguson .............. B60W 10/02
  192/3.52
5,018,610 A * 5/1991 Rolinski ............... B60T 11/105
  180/271

(Continued)

FOREIGN PATENT DOCUMENTS

EP 0939251 A2 9/1999
JP 2012-056430 A 3/2012

*Primary Examiner* — David M Fenstermacher
(74) *Attorney, Agent, or Firm* — Oliff PLC

(57) ABSTRACT

Shift device for vehicle includes housing and shift lever. Shift lever includes cylindrical shaft portion which proximal end is pivotably supported inside housing, cylindrical shaft portion having elongated holes extending through peripheral wall of cylindrical shaft portion and are elongated in longitudinal direction of cylindrical shaft portion, shift knob fixed to distal end of cylindrical shaft portion, detent pin inserted through elongated holes in state where both ends of detent pin protrude from corresponding elongated holes, detent rod inserted in cylindrical shaft portion, detent rod being configured to transmit operating force of operating button in shift knob to detent pin, and shift lock member. Detent pin is fitted to detent rod. When operating button has been operated in state where brake depression operation is not performed, shift lock member contacts with one end of detent pin to block movement of detent pin.

1 Claim, 9 Drawing Sheets

(51) Int. Cl.
*F16H 61/22* (2006.01)
*B60K 20/02* (2006.01)

(56) References Cited

U.S. PATENT DOCUMENTS

| | | | | |
|---|---|---|---|---|
| 5,314,049 | A * | 5/1994 | Nordstrom | F16H 59/10 180/271 |
| 5,577,418 | A * | 11/1996 | Traxler | F16H 59/10 74/528 |
| 5,695,429 | A * | 12/1997 | Kataumi | F16H 59/10 192/220.3 |
| 5,799,538 | A * | 9/1998 | DeJonge | B60K 20/02 74/473.28 |
| 6,067,873 | A * | 5/2000 | Kovach | F16H 59/0278 403/119 |
| 2004/0226801 | A1* | 11/2004 | De Jonge | F16H 59/0204 192/220.7 |
| 2007/0234837 | A1* | 10/2007 | Russell | F16H 59/10 74/473.12 |
| 2008/0093194 | A1* | 4/2008 | Vermeersch | F16H 61/22 192/220.2 |
| 2009/0025501 | A1* | 1/2009 | Mitteer | F16H 61/22 74/473.12 |
| 2009/0217782 | A1* | 9/2009 | Wang | F16H 59/10 74/473.21 |

* cited by examiner

SHIFT DEVICE FOR VEHICLE

INCORPORATION BY REFERENCE

The disclosure of Japanese Patent Application No. 2015-111777 filed on Jun. 1, 2015 including the specification, drawings and abstract is incorporated herein by reference in its entirety.

BACKGROUND OF THE INVENTION

1. Field of the Invention

The invention relates to a shift device for a vehicle and, more particularly, to a technique for preventing or reducing a pivot of a detent pin due to contact with a shift lock member.

2. Description of Related Art

There is known a shift device for a vehicle. The shift device includes a shift lever. The shift lever includes a cylindrical shaft portion and a shift knob. The proximal end of the cylindrical shaft portion is pivotably supported inside a housing. The shift knob is fixed to the distal end of the cylindrical shaft portion. The cylindrical shaft portion has elongated holes. Each of the elongated holes extends through the peripheral wall of the cylindrical shaft portion, and is elongated in the longitudinal direction of the cylindrical shaft portion. A detent pin is inserted through the elongated holes such that both ends of the detent pin protrude from the elongated holes. An operating button is provided in the shift knob. A detent rod transmits operating force of the operating button to the detent pin. The detent rod is inserted in the cylindrical shaft portion, This is, for example, a shift device for a vehicle, described in Japanese Patent Application Publication No. 2012-56430 (JP 2012-56430 A). In the shift device for a vehicle, described in JP 2012-56430 A, in a state where an engaging protrusion protruding from the detent rod toward the detent pin is engaged with an engaging hole provided in the detent pin, the detent pin is constantly urged toward the detent rod by a spring. Both ends of the detent pin respectively protruding from the elongated holes of the cylindrical shaft portion each are engaged with any one of detent grooves that are provided in each of detent plates provided in the housing and that correspond to shift positions. Thus, the shift lever is positioned to the any one of the shift positions.

Incidentally, there is known a shift lock device for a vehicle. When the operating button has been operated in a state where brake depression operation is not performed, the shift lock device restricts releasing operation for releasing engagement of the detent pin with the detent groove corresponding to, for example, a P position as a result of contact of a shift lock member with one end of the detent pin to block movement of the detent pin. If such a shift lock device is applied to the above-described existing shift device, the detent pin urged by the spring toward the detent rod may pivot on the contact position with the shift lock member as a fulcrum to be inclined by operating force of an operating button, transmitted via the detent rod. Because of such a pivot of the detent pin due to activation of the shift lock device, there is a possibility that the durability of the shift device decreases.

SUMMARY OF THE INVENTION

The invention provides a shift device for a vehicle, which prevents or reduces a pivot of a detent pin due to contact with a shift lock member, An aspect of the invention provides a shift device for a vehicle. The shift device includes a housing and a shift lever. The shift lever includes a cylindrical shaft portion of which a proximal end is pivotably supported inside the housing, the cylindrical shaft portion having elongated holes that extend through a peripheral wall of the cylindrical shaft portion and that are elongated in a longitudinal direction of the cylindrical shaft portion, a shift knob fixed to a distal end of the cylindrical shaft portion, a detent pin inserted through the elongated holes in a state where both ends of the detent pin protrude from the corresponding elongated holes, a detent rod inserted in the cylindrical shaft portion, the detent rod being configured to transmit operating force of an operating button provided in the shift knob to the detent pin, and a shift lock member. The detent pin is fitted to the detent rod. When the operating button has been operated in a state where brake depression operation is not performed, the shift lock member contacts with one end of the detent pin to block movement of the detent pin. A support protrusion that protrudes toward the proximal end of the cylindrical shaft portion is provided at the other end of the detent pin. The support protrusion contacts with the cylindrical shaft portion and restricts an inclination of the detent pin due to contact between the shift lock member and the detent pin.

With the shift device according to the aspect of the invention, the support protrusion that contacts with the cylindrical shaft portion to restrict an inclination of the detent pin due to contact between the shift lock member and the detent pin protrudes from the other end of the detent pin toward the proximal end of the cylindrical shaft portion. For this reason, when the operating button is operated in a state where brake depression operation is not performed and movement of the detent pin is blocked as a result of contact of the shift lock member with one end of the detent pin, reaction force in the direction opposite to moment that is applied to the detent pin as a result of operating force of the operating button on the contact position of the one end of the detent pin with the shift lock member as a fulcrum is applied to the other end of the detent pin from the cylindrical shaft portion with which the support protrusion protruded toward the proximal end of the cylindrical shaft portion contacts. Thus, a pivot of the detent pin due to contact with the shift lock member is prevented or reduced, and an inclination of the detent pin is restricted, so a decrease in the durability of the shift device is prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the shift device for a vehicle according to the invention will be described in detail with reference to the accompanying drawings.

Figure 1:
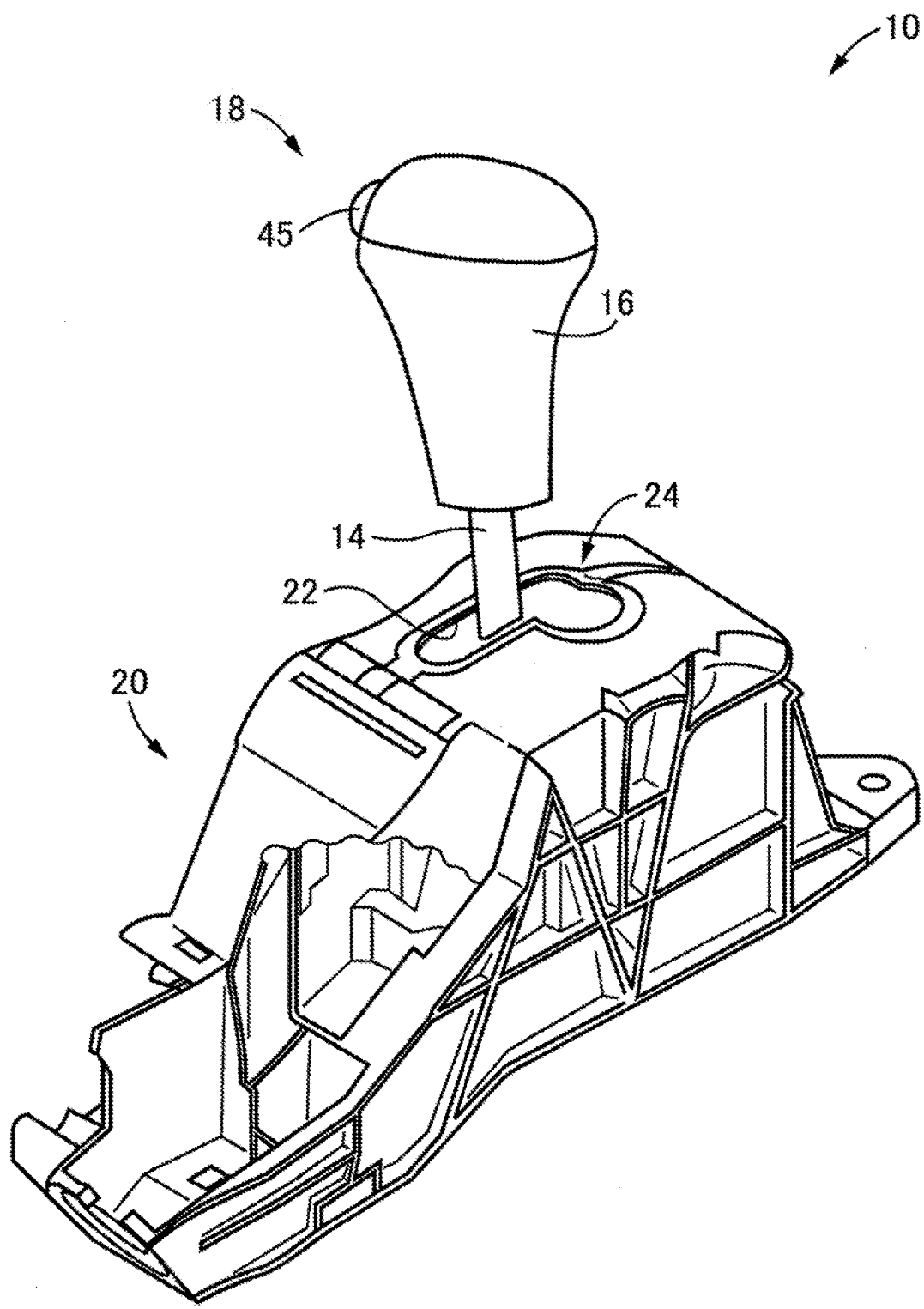
FIG. 1 is a perspective view of a shift device for a vehicle according to an embodiment of the invention.
Figure 4:
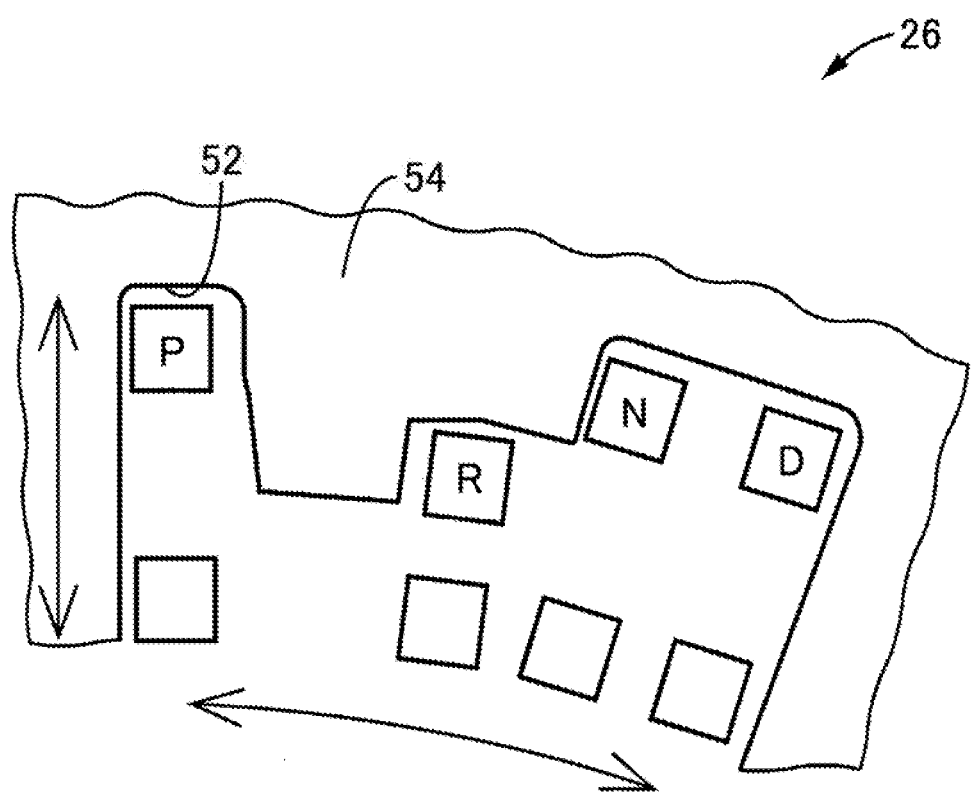
FIG. 4 is a view of one of detent plates provided in a housing of the shift device for a vehicle, shown in FIG. 1.

FIG. 1 is a perspective view of a shift device 10 for a vehicle according to the embodiment of the invention. The shift device 10 includes a shift lever 18, a bearing member (not shown), a control lever (not shown), and a housing 20. The shift lever 18 includes a support portion 36, a lever pipe 14, and a shift knob 16. The support portion 36 is pivotably supported via a spherical proximal end 12 (shown in FIG. 2). The proximal end of the lever pipe 14 is supported by the support portion 36. The shift knob 16 is fixed to the distal end of the lever pipe 14. The bearing member has a spherical bearing surface that receives the spherical proximal end 12 and that is slidable on the spherical proximal end 12. The control lever is assembled to the shift lever 18, and transmits operation of the shift lever 18 in a shift direction to an automatic transmission via a cable (not shown). The housing 20 accommodates the bearing member and the lower end of the shift lever 18 and control lever, and is fixed to a floor, or the like, in a vehicle cabin. The support portion 36 of which the spherical proximal end 12 is pivotably supported inside the housing 20 and the lever pipe 14 of which the proximal end is fixed inside the support portion 36 function as a cylindrical shaft portion according to the invention. The shift lever 18 is provided upright on the housing 20 so as to be pivotable in the shift direction or a select direction around the center of the spherical proximal end 12 slidably supported by the bearing member. The housing 20 includes a shift gate 24 as its upper wall face. The shift gate 24 is a plate-shaped member having a guide slot 22. The guide slot 22 allows the lever pipe 14 of the shift lever 18 to extend therethrough, and guides the shift lever 18 to any one of shift positions, such as a parking position (P position), a reverse position (R position), a neutral position (N position) and a drive position (D position). Detent plates 26 are provided in the housing 20 as shown in FIG. 4. Each of the detent plates 26 has a wall shape. The detent plates 26 are used to regulate a shift operation, for example, an operation to change the shift position between the parking position and the reverse position, that is, a non-parking position, by placing the shift lever 18 to any one of the above-described shift positions.

Figure 2:
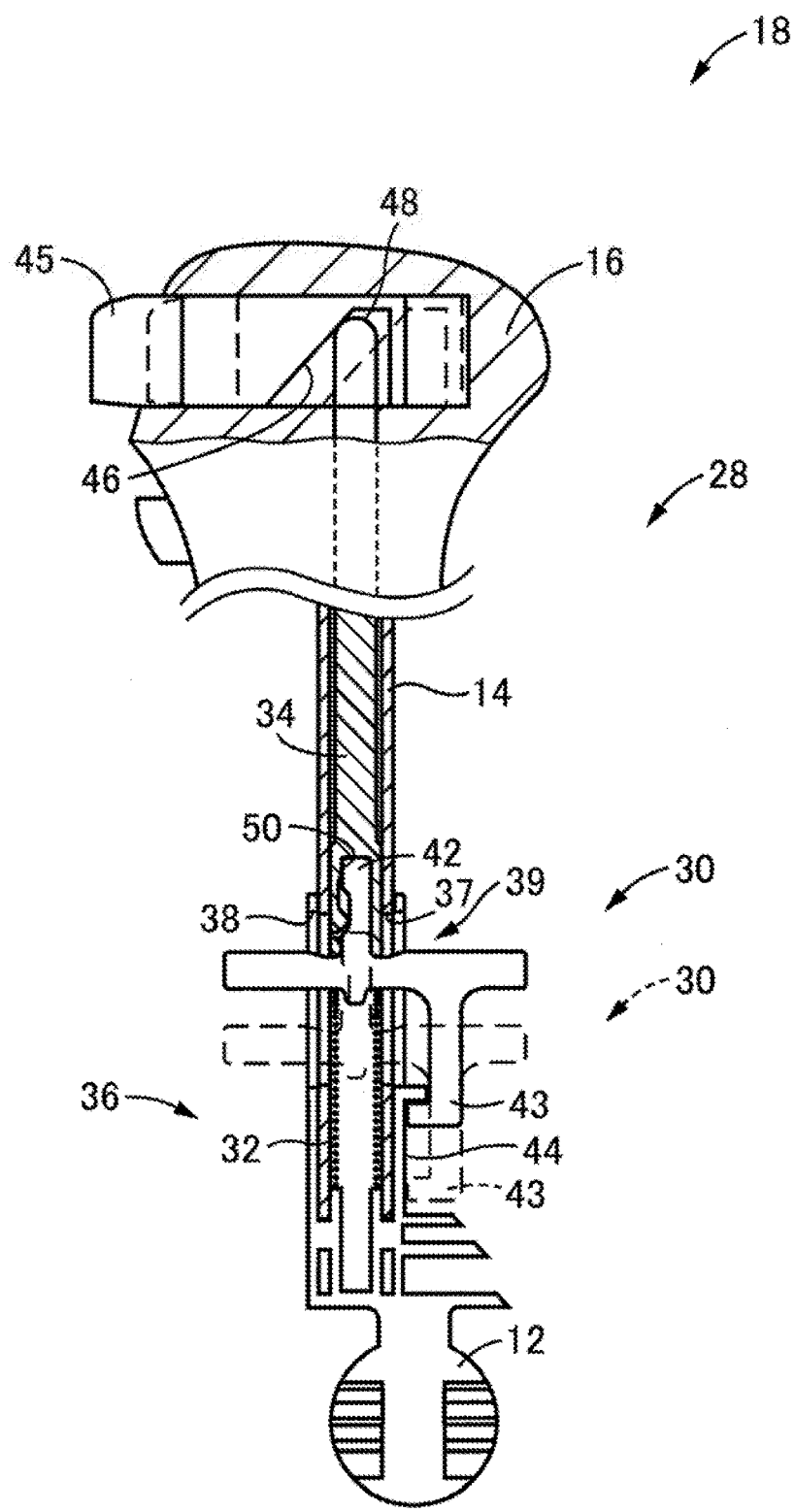
FIG. 2 is a cross-sectional view of a shift lever of the shift device for a vehicle, shown in FIG. 1, with part cut away.
Figure 3:
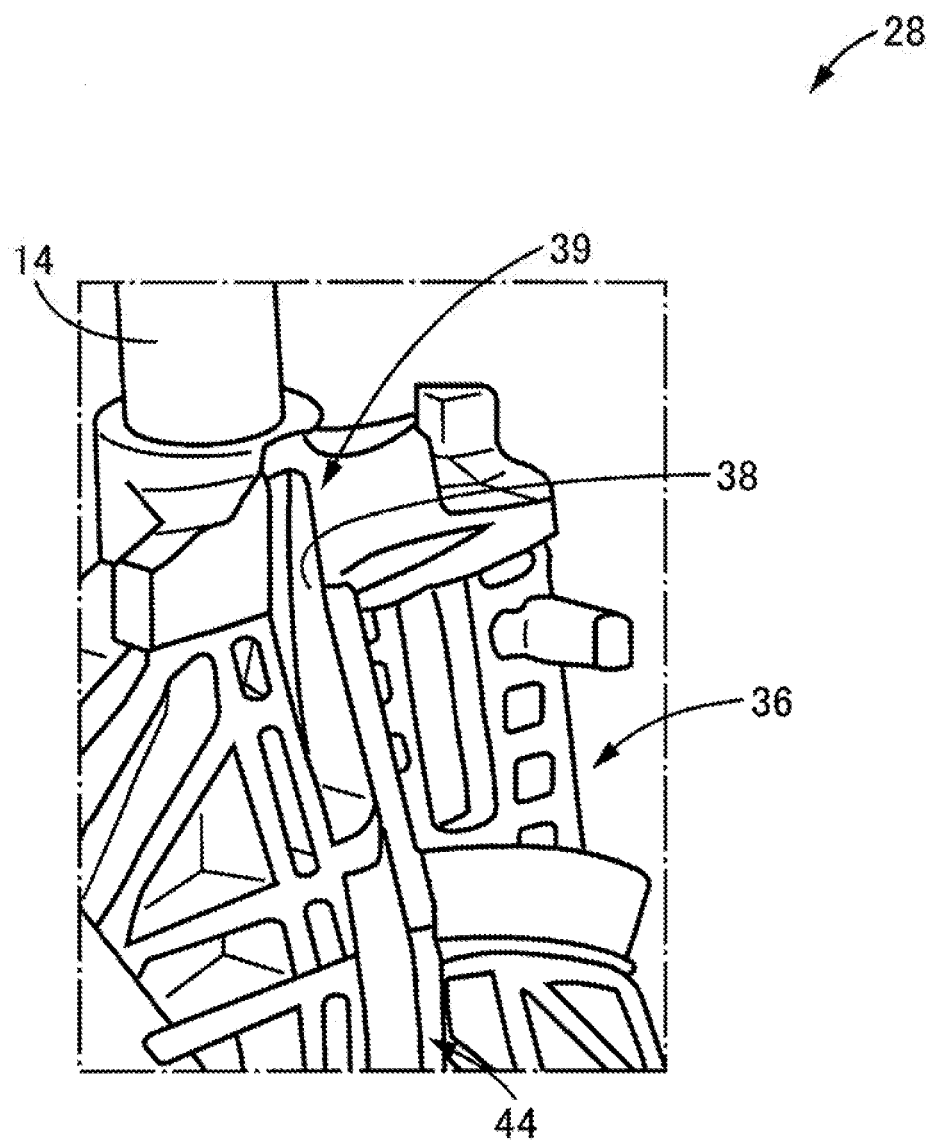
FIG. 3 is an enlarged perspective view of one of elongated holes provided in an assembly of the shift lever shown in FIG. 2.

FIG. 2 is a cross-sectional view of the shift lever 18 accommodated in the housing 20 of the shift device 10. The shift lever 18 includes an assembly 28 (lever subassy), a detent pin 30, a spring 32, a detent rod 34, and the shift knob 16. The assembly 28 includes the cylindrical lever pipe 14, the support portion 36, and the spherical proximal end 12. The lever pipe 14 is made of resin. The support portion 36 includes a cylindrical hole and a columnar hole. The cylindrical hole fixes the lever pipe 14 inside by allowing the proximal end of the lever pipe 14 to be fitted therein. The columnar hole has an annular end face that is provided on the radially inner side of the cylindrical hole and that supports one end of the spring 32. The spring 32 has an outside diameter smaller than the inside diameter of the lever pipe 14. The spherical proximal end 12 is formed on the vehicle lower side of the support portion 36. FIG. 3 is an enlarged perspective view of part of the assembly 28. The assembly 28 has a pair of elongated holes 39 for the detent pin, which are used to insert the detent pin 30 in a direction perpendicular to the assembly 28. Each of the pair of elongated holes 39 is formed of a lever pipe-side elongated hole 37 and a support portion-side elongated hole 38 so as to be elongated in the axial direction of the lever pipe 14. The lever pipe-side elongated hole 37 extends through the peripheral wall of the lever pipe 14 in a direction perpendicular to the axial direction of the lever pipe 14. The support portion-side elongated hole 38 extends through the peripheral wall of the support portion 36, facing the lever pipe-side elongated hole 37. The detent pin 30 is inserted in the elongated holes 39 in a state where both ends of the detent pin 30 protrude from the corresponding elongated holes 39. The detent pin 30 includes a fitting protrusion 42 and a support protrusion 43. The fitting protrusion 42 is protruded toward the detent rod 34, that is, the upward side in FIG. 2. The support protrusion 43 is protruded in an arm shape toward the proximal end of the lever pipe 14 at the other end of both ends protruded from the elongated holes 39 across the fitting protrusion 42 from one end with which a shift lock link 56 (described later) contacts, and supports the detent pin 30 by contact with the support portion 36 that fits the proximal end of the lever pipe 14 therein and supports the proximal end of the lever pipe 14. The protruded end of the support protrusion 43 is moved inside a recessed groove 44 that is provided in the support portion 36 below the corresponding elongated hole 39 and that is elongated in the axial direction of the lever pipe 14. The shift knob 16 includes a knob button 45. The knob button 45 functions as an operating button provided so as to be movable in a direction perpendicular to the axial direction of the lever pipe 14 and urged by a spring (not shown) in a protruded direction. The detent rod 34 includes a hemispherical surface 48 at its upper end and a fitting hole 50 at its lower end. The hemispherical surface 48 is in contact with a cam face 46 of the knob button 45. The fitting protrusion 42 of the detent pin 30 is fitted to the fitting hole 50. The detent rod 34 is inserted in the lever pipe 14 and fitted to the fitting protrusion 42 of the detent pin 30 so as to be able to transmit operating force of the knob button 45 provided in the shift knob 16 to the detent pin 30. The detent pin 30 is constantly urged by the spring 32 arranged at the support portion 36 of the assembly 28 toward the detent rod 34 in a direction opposite to the direction of the operating force of the knob button 45. Both ends of the detent pin 30 are respectively engaged with the detent plates 26 (described later).

As the knob button 45 is moved from the position indicated by the continuous line to the position indicated by the dashed line as a result of pressing operation of the knob button 45 of the shift knob 16, the detent pin 30 is moved away from the detent rod 34 downward from the position indicated by the continuous line in FIG. 2 to the position indicated by the dashed line by the operating force of the knob button 45, which is transmitted via the detent rod 34, against the urging force of the spring 32 toward the detent rod 34. FIG. 4 is a view that shows one of the detent plates 26 provided in the housing 20. A shift operation direction of the shift lever 18 is indicated by the horizontal arrow, and an actuating direction of the detent pin 30 is indicated by the vertical arrow. Each detent plate 26 includes detent grooves 52 and a regulating wall 54. The detent grooves 52 respectively correspond to the shift positions, that is, the parking position (P position), the reverse position (R position), the neutral position (N position) and the drive position (D position), with which the detent pin 30 is engaged. The regulating wall 54 regulates shift operation of the shift lever 18, which is indicated by the horizontal arrow in FIG. 4. When the knob button 45 is not operated, the detent pin 30 is engaged with the detent groove 52 corresponding to any one of the shift positions of each detent plate 26 by the urging force of the spring 32. The regulating wall 54 restricts movement of the detent pin 30 between the parking position and the reverse position and movement of the detent pin 30 from the neutral position to the reverse position to regulate corresponding shift operations of the shift lever 18 when the knob button 45 is not operated. As the knob button 45 is operated, the detent pin 30 to which the operating force of the knob button 45 is transmitted via the detent rod 34 is moved to any one of the positions indicated by the squares at the lower side in FIG. 4 and corresponding to the detent groove 52 of each shift position, and is allowed to move in the shift operation direction. Thus, an operation to change the shift position between the parking position and the reverse position and an operation to change the shift position of the shift lever 18 from the neutral position to the reverse position are enabled. As the operation of the knob button 45 is ended, the detent pin 30 is moved toward the detent rod 34 by the urging force of the spring 32, and is engaged with the pair of detent grooves 52 corresponding to any changed one of the shift positions.

Figure 5:
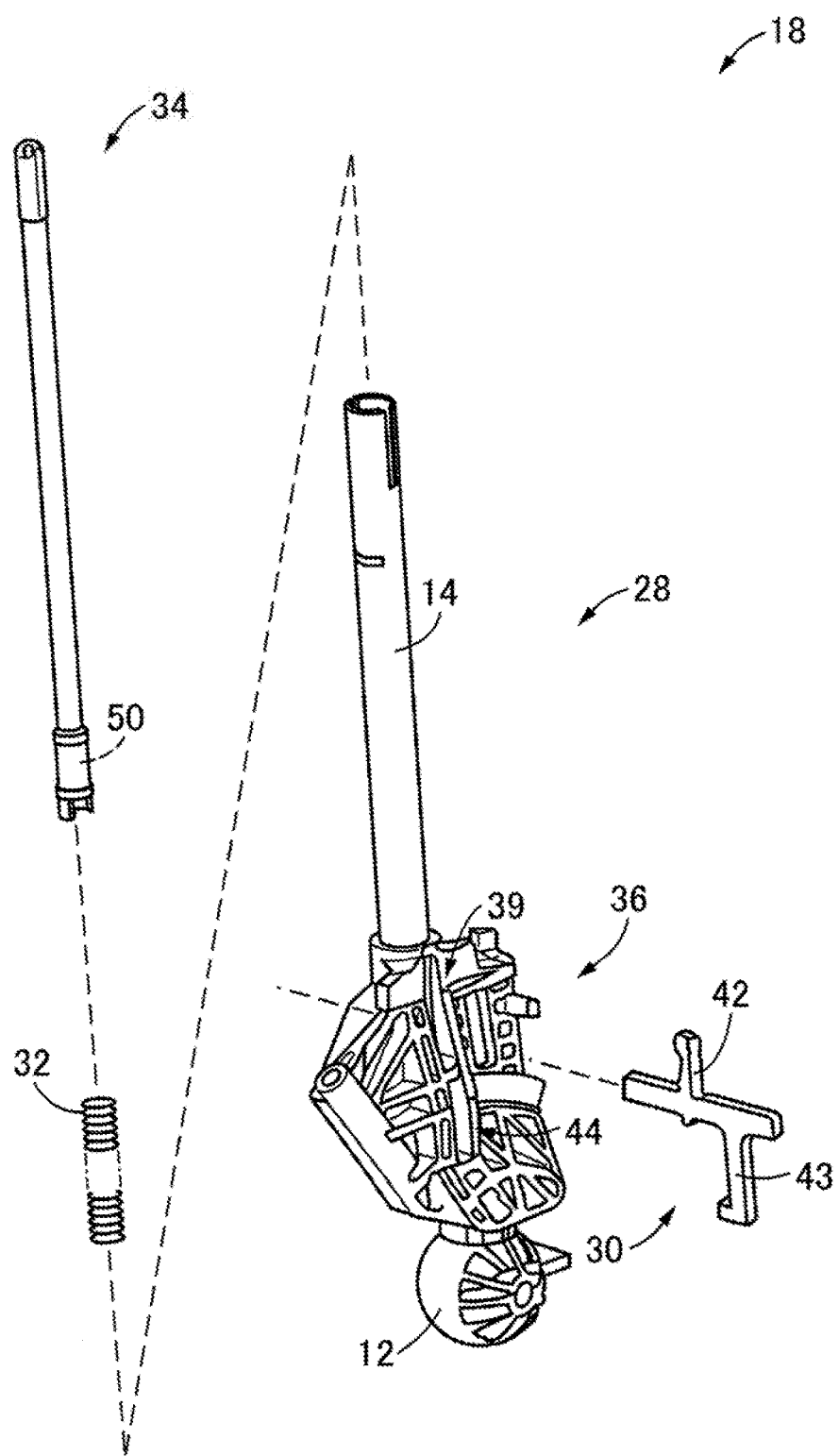
FIG. 5 is a perspective view that separately shows the assembly, a spring, a detent pin and a detent rod that constitute the shift lever shown in FIG. 2.
Figure 6:
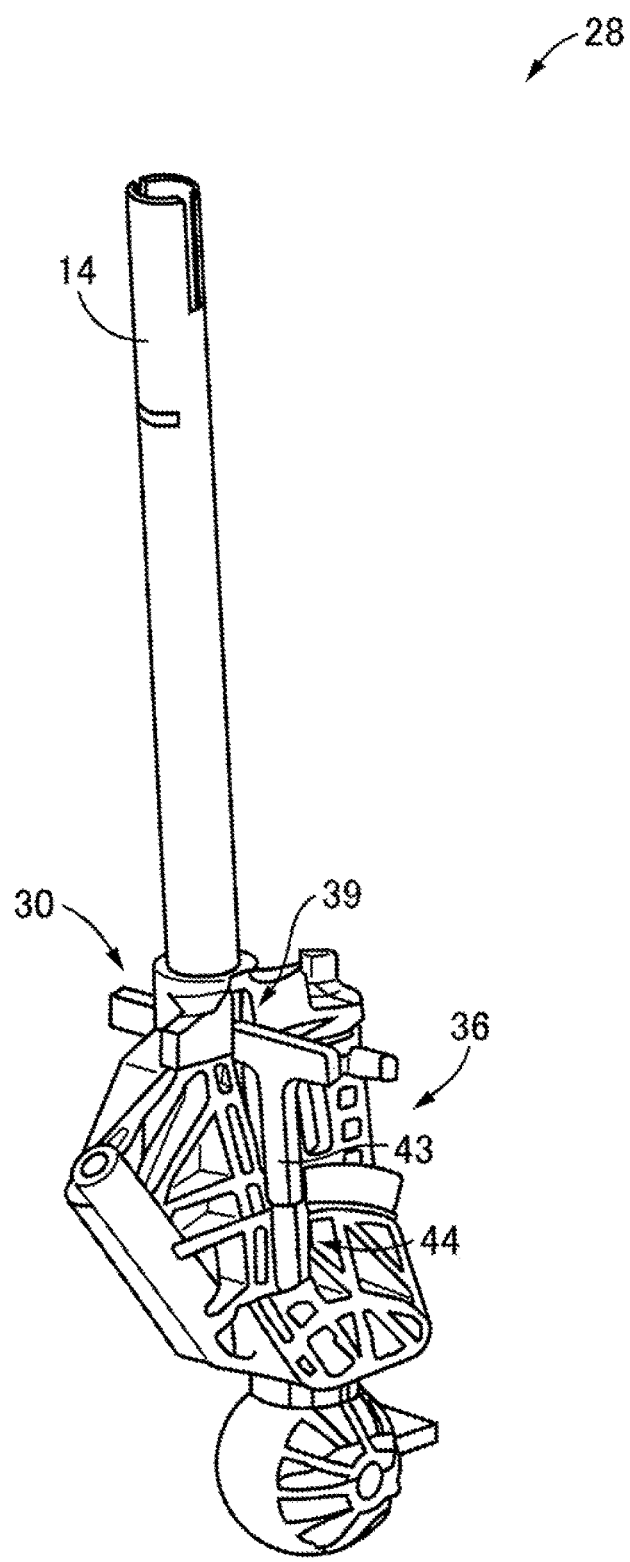
FIG. 6 is a perspective view that shows a state where the spring and the detent pin are arranged in the assembly shown in FIG. 5.
Figure 7:
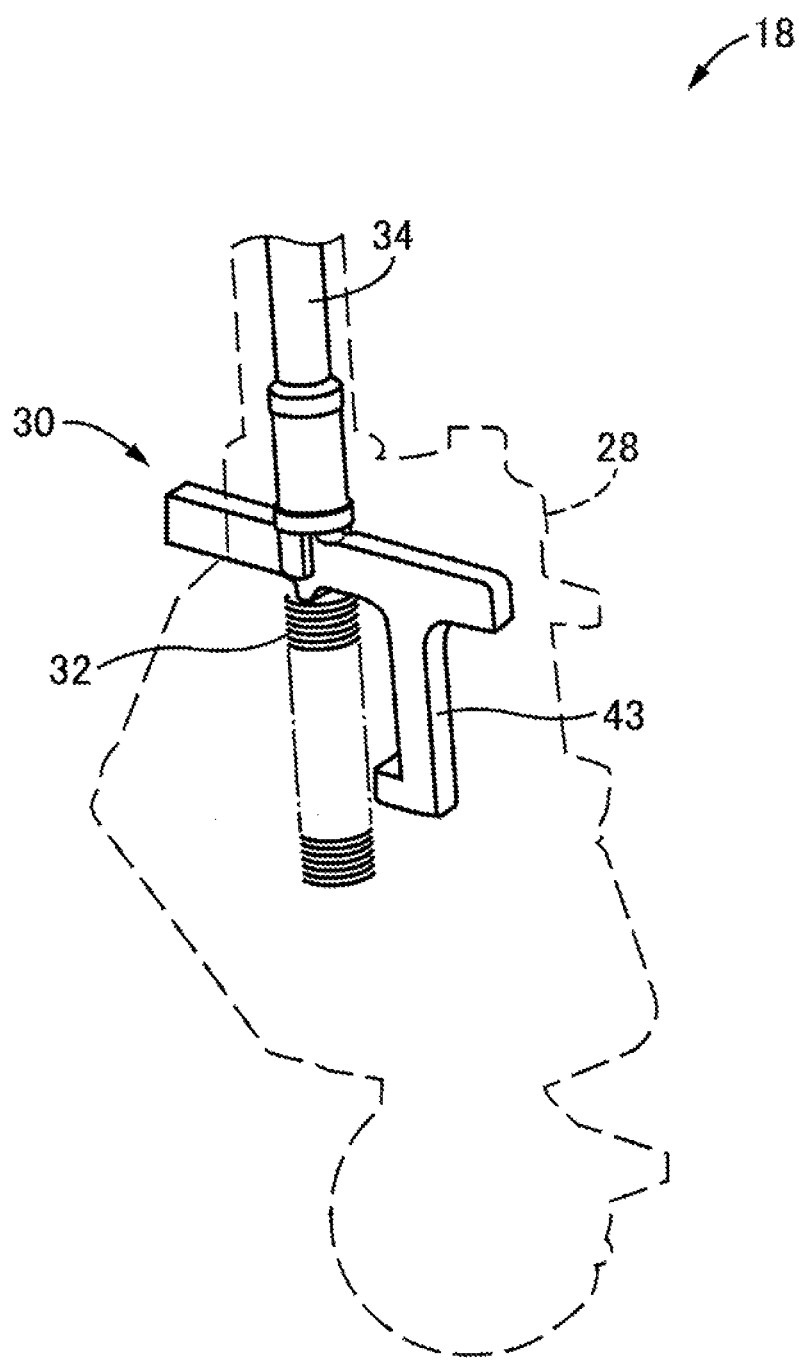
FIG. 7 is a view that shows an assembled state of the shift lever including the assembly shown in FIG. 5, the spring, the detent pin and the detent rod.

FIG. 5 is a perspective view that separately shows the assembly 28, the detent rod 34, the detent pin 30 and the spring 32 before assembling, which constitute the shift lever 18 accommodated in the housing 20 of the shift device 10. The shift lever 18 is assembled in accordance with the following steps. Initially, the spring 32 is inserted from the upper opening of the lever pipe 14 of the assembly 28, and then the lower end of the spring 32 is supported by the annular end face of the support portion 36. Subsequently, the detent pin 30 is inserted into the elongated holes 39 of the assembly 28 from one end of both ends of the detent pin 30, which is the other side across from the side at which the support protrusion 43 is provided, and both ends of the detent pin 30 are inserted so as to protrude from the elongated holes 39 such that the fitting protrusion 42 is located at the center line of the lever pipe 14 and the protruded end of the support protrusion 43 is located in the recessed groove 44. FIG. 6 is a perspective view of the shift lever 18 in a state where the spring 32 and the detent pin 30 are arranged in the assembly 28. Subsequently, the detent rod 34 is inserted into the opening of the lever pipe 14 from its lower end at which the fitting hole 50 is provided, and the fitting hole 50 of the detent rod 34 is fitted to the fitting protrusion 42 of the detent pin 30. FIG. 7 is a view that shows an assembled state of the spring 32, detent pin 30 and detent rod 34 inside the assembly 28 of the shift lever 18. The assembly 28 is indicated by the dashed line.

Figure 8:
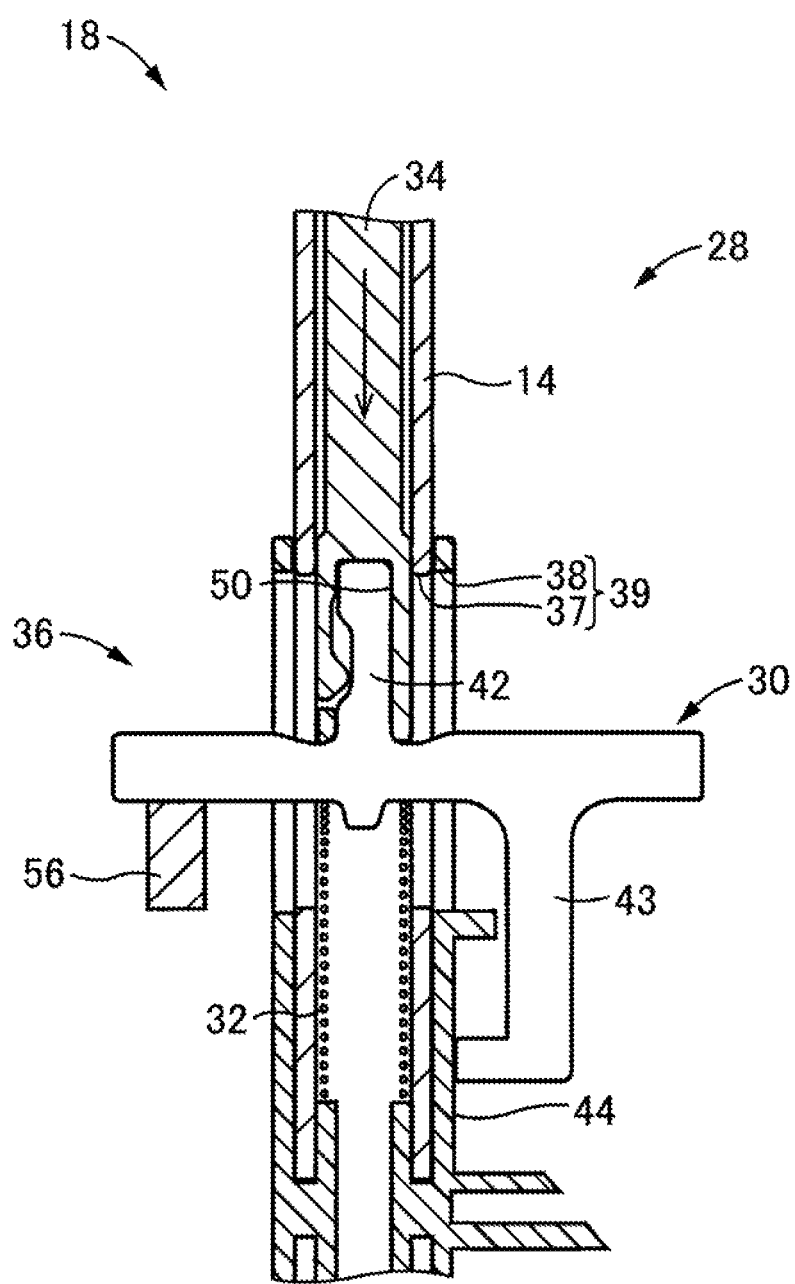
FIG. 8 is a cross-sectional view taken along the axis of a lever pipe of the shift lever, showing a state of the shift lever shown in FIG. 2 where brake depression operation is not performed and releasing operation for releasing engagement of the detent pin from any one of detent grooves of each of detent plates is restricted.

The shift device 10 includes a shift lock device. For example, when the shift position of the shift lever 18 is placed at the parking position (P position), the shift lock device restricts releasing operation for releasing engagement of the detent pin 30 with the detent grooves 52 corresponding to the P position, and cancels the restriction on the releasing operation interlocking with brake operation of the vehicle. FIG. 8 is a cross-sectional view taken along the axis of the lever pipe 14, showing a state where the above-described releasing operation of the shift lever 18 is restricted in response to activation of the shift lock device. The shift lock device includes the shift lock link 56. The shift lock link 56 is movable between a lock position at which the releasing operation is restricted and a non-lock position at which a restriction on the releasing operation is cancelled. The shift lock link 56 serves as a shift lock member according to the invention. When the knob button 45 has been operated in a state where brake depression operation is not performed in the P position, the shift lock link 56 contacts with one end of the detent pin 30 across the fitting protrusion 42 from the other end at which the support protrusion 43 is provided, and blocks movement of the detent pin 30 away from the detent rod 34, that is, downward in FIG. 8 when operating force of operation of the knob button 45, indicated by the arrow, via the detent rod 34 is transmitted to the detent pin 30. Thus, the shift lever 18 is not allowed to move from the P position. When the knob button 45 has been operated in the state shown in FIG. 8 where the brake depression operation is not performed and the releasing operation is restricted, reaction force in a direction opposite to moment that is received as a result of operating force of the knob button 45 on the contact position with the shift lock link 56 as a fulcrum is applied to the detent pin 30, that is, the reaction force is applied from the inner wall face of the recessed groove 44, provided in the support portion 36 that fixes the lever pipe 14, to the support protrusion 43 that contacts with the inner wall face of the recessed groove 44. Thus, a pivot of the detent pin 30 due to contact with the shift lock link 56 is prevented or reduced, and an inclination of the detent pin 30 is restricted, so the position of the detent pin 30 at the time when the detent pin 30 is assembled is maintained.

Figure 9:
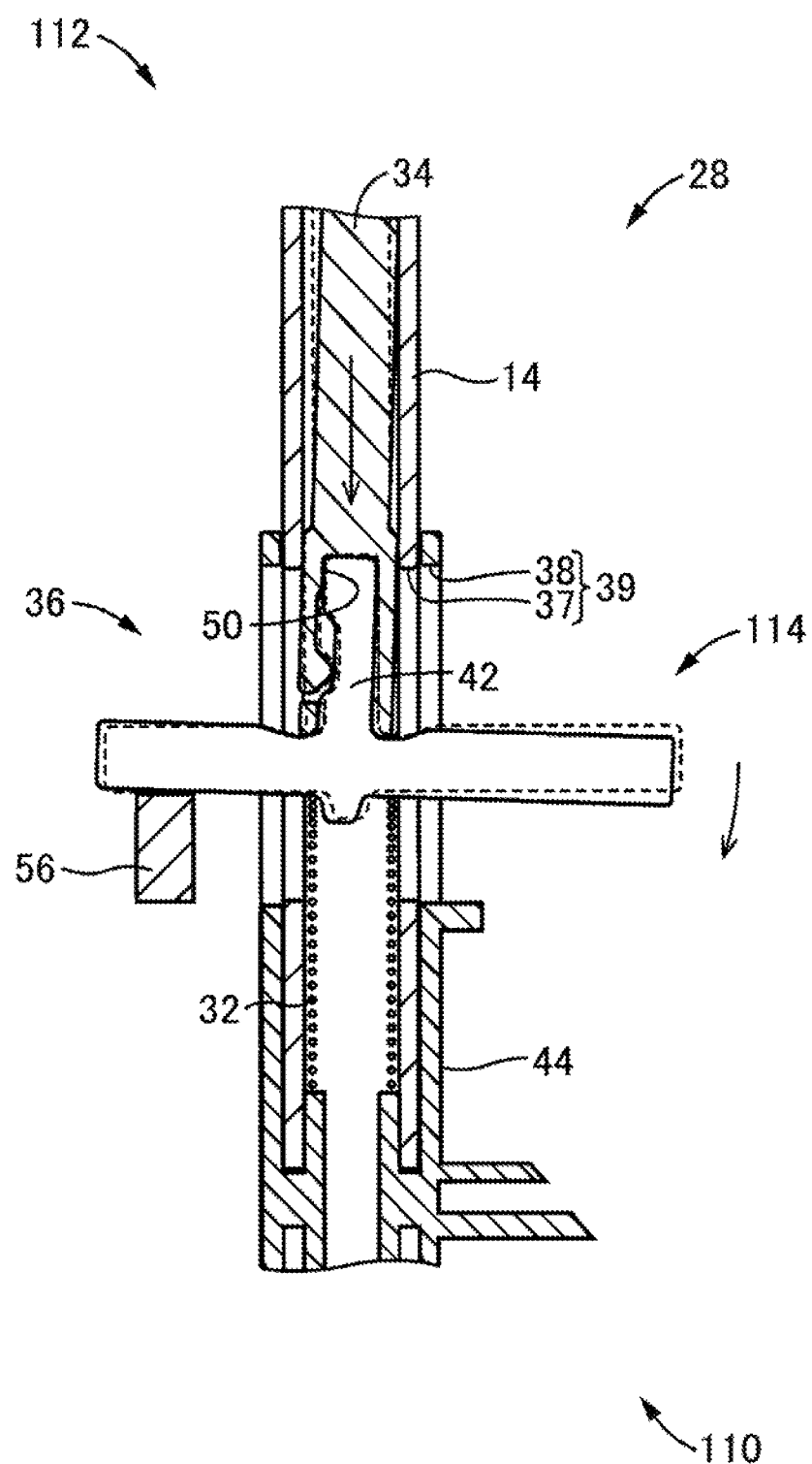
FIG. 9 is a cross-sectional view taken along the axis of the lever pipe, showing a state where a detent pin has pivoted to be inclined (indicated by the continuous line) due to contact with a shift lock link as a result of operation of a knob button in a state where releasing operation for releasing engagement of the detent pin of a shift lever of another shift device for a vehicle from any one of detent grooves of each of detent plates is restricted.

FIG. 9 is a cross-sectional view taken along the axis of the lever pipe 14, showing a relevant portion of a shift lever 112 of a shift device 110 for a vehicle. The shift device 110 has a similar configuration to that of the above-described shift device 10 except that the support protrusion 43 that contacts with the recessed groove 44 of the support portion 36 that fixes the lever pipe 14 is not provided in a detent pin 114 provided in the shift lever 112. In FIG. 9, a state of the detent pin 114 and the detent rod 34 at the time when the releasing operation of the shift lever 112 of which the shift position is, for example, placed at the P position is restricted by the shift lock device is indicated by the dashed line. As the knob button 45 is operated in a state where the releasing operation is restricted while the brake depression operation is not performed, the shift lock link 56 contacts with one end of the detent pin 114, and blocks movement of the detent pin 114 away from the detent rod 34, that is, downward in FIG. 9. As the knob button 45 is operated with a larger force and excessive operating force of the knob button 45 in the direction indicated by the arrow is transmitted to the detent pin 114 via the detent rod 34, the detent pin 114 receives moment resulting from the operating force of the knob button 45 on the shift lock link 56 as a fulcrum, and pivots to be inclined in the arrow direction in FIG. 9. In FIG. 9, the state where the detent pin 114 has pivoted to be inclined as a result of contact with the shift lock link 56 is shown by the detent pin 114 and the detent rod 34, indicated by the continuous line. The pivot of the detent pin 114 due to contact with the shift lock link 56 occurs because reaction force in the direction opposite to moment due to operating force of the knob button 45 resulting from contact with the shift lock link 56 does not act on the detent pin 114 to which the moment is applied.

As described above, with the shift device 10 according to the present embodiment, the support protrusion 43 that contacts with the recessed groove 44 of the support portion 36 that fixes the lever pipe 14 and that restricts an inclination of the detent pin 30 due to contact between the shift lock link 56 and the detent pin 30 protrudes toward the proximal end of the lever pipe 14 at the other end of the detent pin 30 across the fitting protrusion 42 from the one end that contacts with the shift lock link 56. For this reason, when the knob button 45 is operated in a state where brake depression operation is not performed and movement of the detent pin 30 is blocked by contact of the shift lock link 56 with the one end of the detent pin 30, reaction force in the direction opposite to moment that is applied to the detent pin 30 as a result of operating force of the knob button 45 on the contact position of the one end of the detent pin 30 with the shift lock link 56 as a fulcrum is applied to the other end of the detent pin 30 from the inner wall face of the recessed groove 44 of the support portion 36, with which the support protrusion 43 protruded toward the proximal end of the lever pipe 14 contacts. Thus, a pivot of the detent pin 30 due to contact with the shift lock link 56 is prevented or reduced, and an inclination of the detent pin 30 is restricted, so a decrease in the durability of the shift device 10 is prevented.

In the shift device 10 according to the present embodiment, an inclination of the detent pin 30 due to contact with the shift lock link 56 resulting from operation of the knob button 45 during activation of the shift lock device that restricts the releasing operation of the detent pin 30 is prevented or reduced by the support protrusion 43 provided in the detent pin 30. For this reason, without the necessity for fixing the detent pin 30 to the detent rod 34 by swaging or press-fitting in a special facility, a pivot or inclination of the detent pin 30 due to contact with the shift lock link 56 is prevented or reduced.

The embodiment of the invention is described in detail with reference to the accompanying drawings; however, the invention may be implemented in another embodiment. Various modifications may be added without departing from the scope of the invention.

The support protrusion 43 of the detent pin 30 of the shift lever 18 according to the above-described embodiment indirectly contacts with the lever pipe 14 via the inner wall face of the recessed groove 44 of the support portion 36 that fixes the lever pipe 14, and reaction force in the direction opposite to moment that is received by the detent pin 30 that contacts with the shift lock link 56 is applied to the detent pin 30; however, the invention is not limited to this mode. For example, the support protrusion 43 of the detent pin 30 may be configured to directly contact with the lever pipe 14.

What is claimed is:

1. A shift device for a vehicle, the shift device comprising:
a housing; and
a shift lever including
a cylindrical shaft portion of which a proximal end is pivotably supported inside the housing, the cylindrical shaft portion having elongated holes that extend through a peripheral wall of the cylindrical shaft portion and that are elongated in a longitudinal direction of the cylindrical shaft portion,
a shift knob fixed to a distal end of the cylindrical shaft portion,
a detent pin inserted through the elongated holes in a state where both ends of the detent pin protrude from the corresponding elongated holes, and
a detent rod inserted in the cylindrical shaft portion, the detent rod being configured to transmit operating force of an operating button provided in the shift knob to the detent pin, and
a shift lock member, wherein
the detent pin is fitted to the detent rod,
when the operating button has been operated in a state where brake depression operation is not performed, the shift lock member contacts with one end of the detent pin to block movement of the detent pin, and
a support protrusion that protrudes toward the proximal end of the cylindrical shaft portion is provided at the other end of the detent pin, and the support protrusion contacts with the cylindrical shaft portion and restricts an inclination of the detent pin due to contact between the shift lock member and the detent pin.

* * * * *